United States Patent
Dhawan et al.

(10) Patent No.: US 11,676,094 B2
(45) Date of Patent: *Jun. 13, 2023

(54) SYSTEM AND METHOD FOR DETERMINING AND UTILIZING AFTER-CALL-WORK FACTOR IN CONTACT CENTER QUALITY PROCESSES

(71) Applicant: NICE LTD, Ra'anana (IL)

(72) Inventors: Salil Dhawan, Maharashtra (IN); Harshit Kumar Sharma, Maharashtra (IN); Rahul Vyas, Rajasthan (IN)

(73) Assignee: NICE LTD., Ra'anana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/833,909

(22) Filed: Jun. 7, 2022

(65) Prior Publication Data

US 2022/0300886 A1 Sep. 22, 2022

Related U.S. Application Data

(63) Continuation of application No. 17/124,562, filed on Dec. 17, 2020, now Pat. No. 11,386,382.

(51) Int. Cl.
*G06Q 10/06* (2023.01)
*H04M 3/22* (2006.01)
*G06Q 10/0639* (2023.01)

(52) U.S. Cl.
CPC .... *G06Q 10/06398* (2013.01); *H04M 3/2218* (2013.01); *H04M 3/2281* (2013.01)

(58) Field of Classification Search
CPC .......... G06Q 10/06398; H04M 3/2218; H04M 3/2281
USPC .......................................................... 705/7.42
See application file for complete search history.

(56) References Cited

U.S. PATENT DOCUMENTS

| | | | |
|---|---|---|---|
| 6,081,592 A * | 6/2000 | Battle | H04M 3/523 |
| | | | 379/265.05 |
| 6,359,982 B1 * | 3/2002 | Foster | H04M 3/5233 |
| | | | 379/265.1 |
| 11,386,382 B1 * | 7/2022 | Dhawan | H04M 3/2218 |
| 2004/0138944 A1 * | 7/2004 | Whitacre | G06Q 10/06398 |
| | | | 705/7.42 |
| 2021/0112021 A1 * | 4/2021 | Rahalkar | G06Q 30/01 |

* cited by examiner

*Primary Examiner* — Binh Kien Tieu
(74) *Attorney, Agent, or Firm* — Soroker-Agmon-Nordman; Sharone Godesh; Daniel Schatz

(57) ABSTRACT

A computerized-method for calculating an After-Call-Work (ACW) factor of an interaction in a contact center, by which a related recording may be filtered for evaluation is provided herein. The method includes an After-Call-Work (ACW) factor calculation module. The operating of the ACW factor calculation module includes: (i) receiving agent recording of the interaction. (ii) aggregating data fields associated with: (a) the interaction; and (b) the customer; (iii) retrieving ACW time of the interaction; (iv) forwarding the aggregated data fields to a machine learning model; (v) operating the machine learning model to calculate a predicted ACW time, based on the aggregated data fields; (vi) calculating an ACW factor based on the received time of ACW and the calculated predicted ACW time; and (vii) sending the calculated ACW factor to a platform by which the platform is preconfigured to distribute the interaction for evaluation, based on the ACW factor.

30 Claims, 7 Drawing Sheets

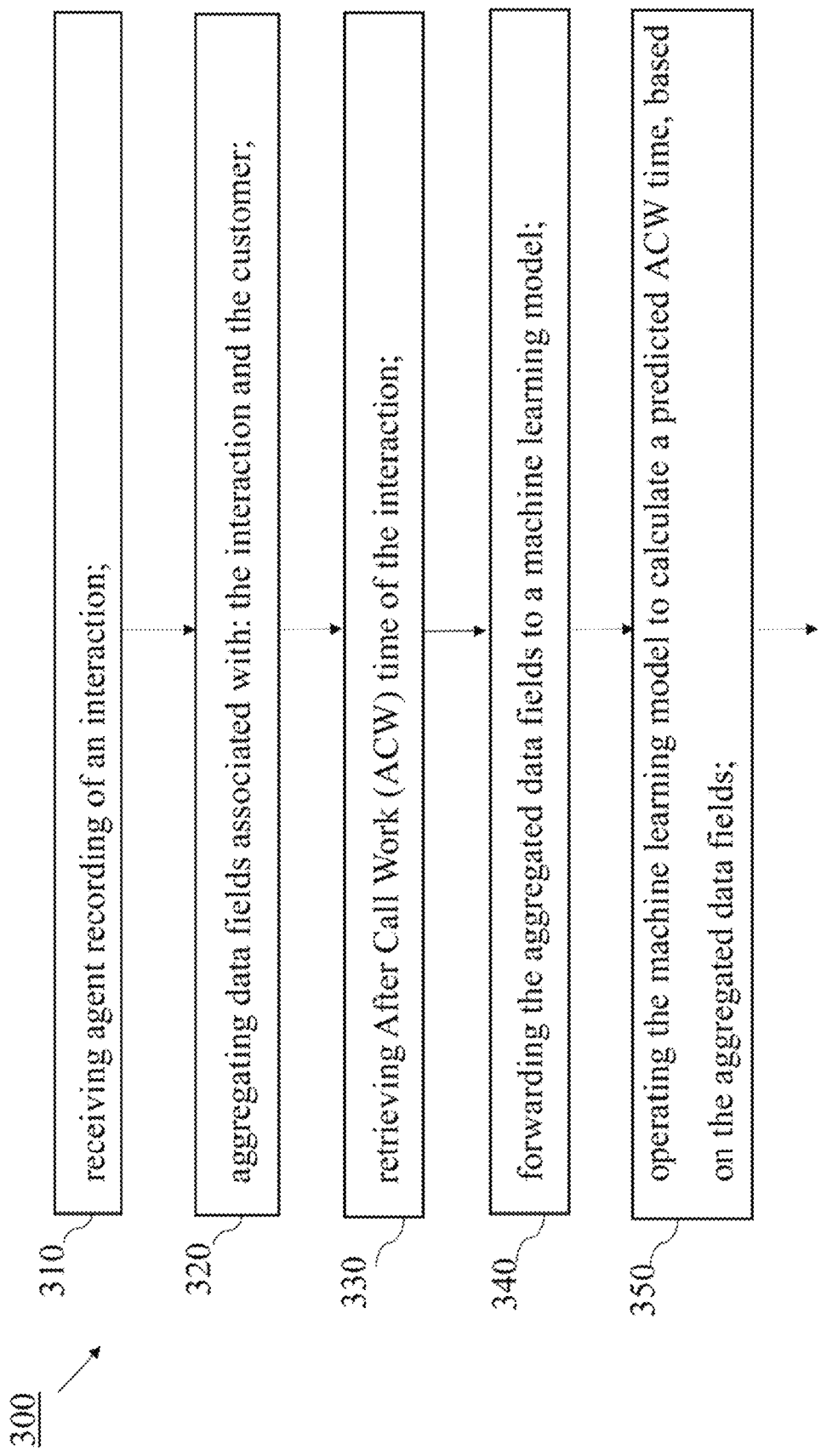

SYSTEM AND METHOD FOR DETERMINING AND UTILIZING AFTER-CALL-WORK FACTOR IN CONTACT CENTER QUALITY PROCESSES

RELATED APPLICATIONS

This application claims priority as a continuation from application Ser. No. 17/124,562 dated Dec. 17, 2020 the disclosure of which is incorporated herein by reference.

TECHNICAL FIELD

The present disclosure relates to the field of data analysis for evaluation in a quality management process in a contact center, according to a calculated factor.

BACKGROUND

To deliver better service to their customers, current systems in contact centers, monitor all agents' interactions and accordingly, based on an evaluation of the monitored interactions, build coaching plans to improve agent's performance. Moreover, current systems in contact centers, maintain a platform with quality management plans, which automatically receive recorded interactions for agents' performance evaluation, randomly or based on business preferences. These systems further maintain automate alerts and distribution of work for evaluations, disputes, calibrations and coaching. To improve the effectiveness of coaching tools, coaching is delivered based on an evaluation of a single interaction or based on the evaluation of trends that might affect business-driven Key Performance Indicators (KPIs).

A Key Performance Indicator (KPI) is a measurable value that demonstrates how effectively an organization is achieving key business objectives. For example, low-level KPIs may focus on processes in individual departments or teams.

One of the top contact center KPIs to measure success is Average Handling Time (AHT)". AHT is the average time that an agent handles an interaction with a customer. The key constituent which impacts AHT calculation is 'After-Call-Work' (ACW) time. ACW refers to the tasks that a contact center agent completes after each customer interaction. ACW includes, e.g., logging of contact reason, outcome, follow-up actions, and various communications.

For large contact centers, that receive hundreds of thousands of calls, a decrease in AHT, may be extremely significant and can add up to millions of dollars in savings per year. A reduction in handle time may yield a reduction in cost per interaction, over the long run.

Moreover, an effective evaluation of the agents may lead to an increased job satisfaction of the agents, resulting in reduced attrition cost. Reducing attrition rate, may be also profitable for the contact center. Reduced attrition rate may lead to low turnover rates resulting in decreased new hire and onboarding cost. Each new agent hire is estimated to cost the contact center $10,000 to $20,000 in training, direct recruiting costs, and lost productivity during ramp up. A Cornell study estimates that replacing one agent equals about 16% of their gross annual earnings.

The ACW is necessary and vital to the overall Net Promoter Score (NPS) of a contact center. It may represent an insight on an activity which may have consequences on customer experience. If agents spend more than 20-30 seconds performing call wrap up tasks, i.e. ACW, there may be an efficiency problem which is jeopardizing agent productivity. Also, if agents are bogged down with ACW tasks, they may end up reducing the quality of their calls, thereby hurting customer experience (CX).

The quality of the ACW may depend on the completeness of the information that has been logged and the time that has taken by the agent to fill up details. The ACW time depends on business domain, call characteristics, contact center processes, etc. Therefore, there may not be determined an absolute ACW time that may be considered long or short, as a benchmark to compare the actual ACW time of each interaction.

Therefore, to improve operational efficiency and customer experience, it may be essential for the contact center to forward interactions having non-standard ACW time for evaluation and inspection purposes, because an interaction with ACW which took the agent long time, in the context of business domain, call characteristics and the like, may hold the agent from answering incoming requests, and an interaction with ACW which took the agent short time, in the relevant context, may indicate that there is incomplete information in the call log.

Accordingly, to identify areas to improve agent's performance and to detect interactions with high AHT, which increases the contact center's costs, there is a need for a technical solution that will provide an indication, as to the ACW time of each interaction which may be used for agent performance evaluation purposes.

SUMMARY

There is thus provided, in accordance with some embodiments of the present disclosure, a computerized-method for calculating an After-Call-Work (ACW) factor of an interaction in a contact center, by which a related recording may be filtered for evaluation.

Furthermore, in accordance with some embodiments of the present disclosure, in a computerized system that is comprising a processor, a database of data related to interaction metadata and skills of agent, a database of customer data; and a memory to store the plurality of databases, the processor may be configured to operate, for each interaction between an agent and a customer, an After-Call-Work (ACW) factor calculation module.

Furthermore, in accordance with some embodiments of the present disclosure, the operating of the ACW calculation module may include: (i) receiving agent recording of the interaction; (ii) aggregating data fields associated with: (a) the interaction; and (b) the customer; (iii) retrieving ACW time of the interaction; (iv) forwarding the aggregated data fields to a machine learning model; (v) operating the machine learning model to calculate a predicted ACW time, based on the aggregated data fields; (vi) calculating an ACW factor based on the received time of ACW and the calculated predicted ACW time; and (vii) sending the calculated ACW factor to a platform by which the platform may be preconfigured to distribute the interaction for evaluation, based on the ACW factor.

Furthermore, in accordance with some embodiments of the present disclosure, the platform may be a quality planner microservice.

Furthermore, in accordance with some embodiments of the present disclosure, the ACW factor may be calculated by dividing a subtraction of the predicted ACW time from the ACW time, by the predicted ACW time.

Furthermore, in accordance with some embodiments of the present disclosure, the data fields associated with the interaction, may include at least one of: duration of the interaction; campaign under which the interaction was taken; First Call Resolution (FCR) achieved; channel switch during the interaction; number of times the customer was on hold; average feedback rating provided by customers in interaction context; a proficiency level of the agent that was used to route the interaction; and an occupancy rate in the contact center before the interaction.

Furthermore, in accordance with some embodiments of the present disclosure, the data fields associated with the customer, may include at least one of: customer feedback for the interaction; customer sentiment score for the interaction; and pattern of customer feedback.

Furthermore, in accordance with some embodiments of the present disclosure, the distributed interaction for evaluation may be reviewed by an evaluator for due consideration and follow-on remedial measures to improve operational efficiency of the contact center and to improve customer satisfaction.

Furthermore, in accordance with some embodiments of the present disclosure, the due consideration may be selected from at least one of: (i) identifying low level of performance of agents; and (ii) inefficient processes in the contact center.

Furthermore, in accordance with some embodiments of the present disclosure, the follow-on remedial measures may be selected from at least one of: (i) assigning the agent to a coaching plan based on the identified low level of performance; and (ii) optimizing processes in the contact center.

Furthermore, in accordance with some embodiments of the present disclosure, the ACW factor may have a value that is positive, negative or zero.

Furthermore, in accordance with some embodiments of the present disclosure, when the value is negative it may be an indication that the interaction should be evaluated for completeness of the information, which has been logged. When the value is positive it may be an indication that the interaction should be evaluated for training requirement for the agent, and when the value is within a preconfigured distance threshold from zero, it may be an indication that the interaction doesn't have to be evaluated in a context of ACW factor.

There is further provided, in accordance with some embodiments of the present disclosure, a computerized-system for calculating an After-Call-Work (ACW) factor of an interaction, in a contact center, by which a related recording may be filtered for evaluation.

Furthermore, in accordance with some embodiments of the present disclosure, the computerized-system may include: a database of data related to interactions and skills of agent; a database of customer metadata; a memory to store the plurality of databases and a processor.

Furthermore, in accordance with some embodiments of the present disclosure, the processor may be configured to operate, for each interaction between an agent and a customer, an ACW factor calculation module.

Furthermore, in accordance with some embodiments of the present disclosure, the operating of the ACW factor calculation module may be configured to: (i) receive agent recording of the interaction; (ii) aggregate data fields associated with: (a) the interaction; and (b) the customer, and ACW time of the interaction; (iii) forward the aggregated data fields to a machine learning model; (iv) operate the machine learning model to calculate a predicted ACW time; (v) calculate an ACW factor based on the time of ACW and the calculated predicted ACW time; and (vi) send the calculated ACW factor to a platform by which the platform is preconfigured to distribute the interaction for evaluation, based on the ACW factor.

BRIEF DESCRIPTION OF THE DRAWINGS

FIGS. 3A-3B are a high-level workflow of ACW factor calculation module for calculating an ACW factor of an interaction in a contact center, by which a related recording may be filtered for evaluation, in accordance with some embodiments of the present disclosure;

DETAILED DESCRIPTION

Figure 1:
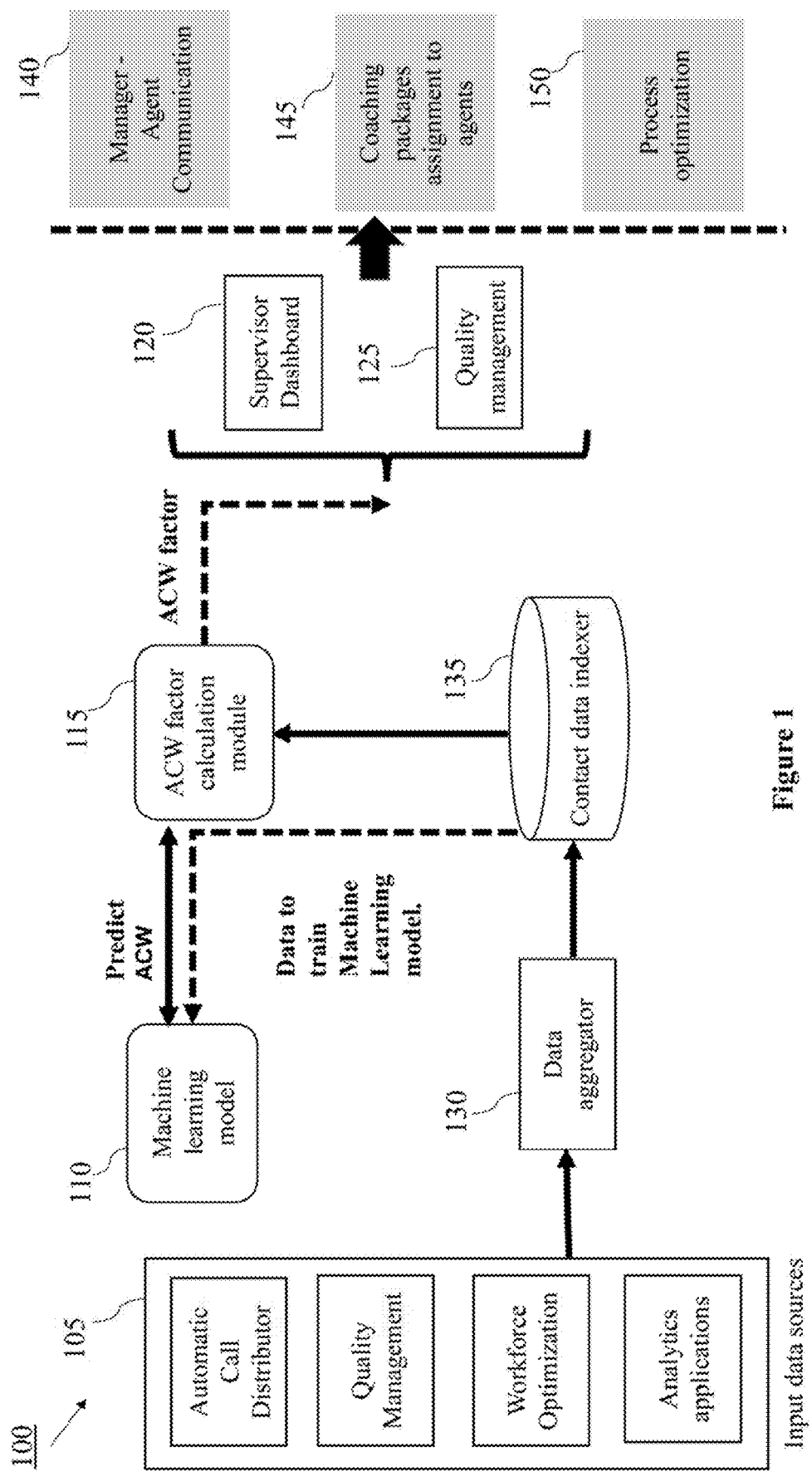
FIG. 1 schematically illustrates a high-level diagram of a computerized system for calculating an After-Call-Work (ACW) factor of an interaction in a contact center, by which a related recording may be filtered for evaluation, in accordance with some embodiments of the present disclosure.

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

The terms "interaction" and "call" are interchangeable.

The term "recording", as used herein, refers to one or more segments of a recording of an interaction.

The terms "caller", "customer" and "client" are interchangeable.

The term "Net Promoter Score", as used herein, refers to a management tool that can be used to gauge the loyalty of firm's customer relationships.

The term "proficiency level of the agent" as used herein, refers to an input value that gives an indication as to the level of proficiency that is used to route an incoming interaction, according to the expected complexity of the interaction.

The term "First Call resolution (FCR)" as used herein, refers to a value which indicates if customer's issues have been resolved in the first attempt.

The term "campaign" as used herein, refers an input value which indicates what is the domain that the interaction has been initiated under. For example, sales, fundraising and the like.

The term "channel switch" as used herein, refers to a value which indicates if during the interaction there has been a switch of the channel. For example, the interaction was switched from email to phone call.

The term "Elastic Load Balancing (ELB)" as used herein refers to a load-balancing service in a cloud-based computing environment, such as Amazon Web Services (AWS) deployments. ELB automatically distributes incoming application traffic and scales resources to meet traffic demands. The ELB may be attached for each Micro-Service (MS) instance. In a non-limiting example, for each database, such as MySQL instance, an ELB may be attached to it. The purpose of automatic scaling is to automatically increase the size of Auto Scaling group, when demand for resources goes up and to decrease it when demand goes down. As capacity is increased or decreased, the Amazon EC2 instances which are being added or removed, must be registered or deregistered with a load balancer. This enables an application to automatically distribute incoming web traffic across such a dynamically changing number of instances.

The term "Elastic Search" (ES) as used herein, refers to a document-oriented database designed to store, retrieve, and manage document-oriented or semi-structured data. The recording data is stored inside elastic search in JavaScript Object Notation (JSON) document form. In order to store JSON document data inside elastic search Index Application Programming Interface (API) may be used.

The term "Session Border Controller (SBC)" as used herein, refers to a dedicated device that protects and regulates Internet Protocol (IP) communications flows. SBCs are used to regulate all forms of real-time communications including VoIP, IP video, text chat and collaboration sessions. SBCs manipulate IP communications signaling and media streams, providing a variety of functions including security, Multivendor Interoperability, Protocol Interworking. Quality of Service (QoS), and Session Routing.

The term "Micro Service (MS)" as used herein, refers to an instance that is facilitated in an MS architecture, which is supporting high availability and auto scaling of computing resources. Each MS is installed inside a docker container, such as an instance of Amazon's Elastic Compute Cloud (EC2). Amazon EC2 instance is a virtual server in EC2 for running applications on Amazon Web Services (AWS) infrastructure. Each MS is having at least two instances or can be configured to have many instances to provide high availability of computing resources solution with different configurations of Central Processing Unit (CPU), memory, storage and networking resources to accommodate user needs.

For every MS instance, there is attached an Elastic Load Balancer (ELB). ELB is a computing resources load-balancing service for AWS deployments. ELB automatically distributes incoming application traffic and scales computing resources to meet computing traffic demands. The purpose of automatic scaling is to automatically increase the size of auto scaling group, when demand for computing resources goes up and decreases the size of auto scaling group, when demand for computing resources goes down.

As the capacity of AWS increases or decreases, the Amazon EC2 instances, which are being added or removed must be registered or deregistered with a load balancer. This enables an application that is receiving computing resources from AWS to automatically distribute incoming web traffic across a dynamically changing number of instances.

The term "Amazon Kinesis Data Streams (KDS)" as used herein, refers to a service that is used to collect and process large streams of data records in real-time.

The term "Quality Planner (QP)" as used herein, refers to a Micro Service (MS) that enables quality plans management from a centralized location. Quality plans may randomly select agent interactions based on predefined criteria, and then distribute those interactions to evaluators for evaluation and review. After a quality plan is created and activated by the QP MS, it samples interactions from the agents, which are defined in the quality plan and sent the relevant segments to evaluators for review.

When a Quality Plan is created it is provided with one or more factors of the interaction between the agent and the customer. Based on the one or more factors, recording segments of interactions may be retrieved from document-oriented tables in the cloud-based computing environment. For example, when retrieving x interactions of agent x, y interactions of agent y, z interactions of agent z and so on from the database in the cloud-based computing environment, the QP MS may randomly select any agent from the retrieved agents and then apply filter criteria to the one or more factors to distribute the interaction to an evaluator which is one of a plurality of evaluators.

The QP MS may be used to distribute segments across evaluators as per the configuration of the QP MS. A scheduled job may run as per the configuration in the configuration file, e.g., every two hours, and may distribute the agent recording segments evenly among all evaluators. Whenever a user creates a new quality plan, the QP MS calls MCR Search MS, which queries the elastic search to get the segment records i.e., recording of the agent, as per the one or more factors. The QP MS may fetch the interaction stored inside the elastic search, as per the ACW factor value provided by the user and send such recording of interactions to the evaluator for evaluation purposes.

The term "Amazon Web Services (AWS)" as used herein, refers to a service of an on-demand cloud computing platforms that Amazon provides.

The term "Elastic Compute Cloud (EC2)" as used herein, refers to a scalable computing capacity in the AWS cloud.

The term "Sticky Session Manager (SSM)" as used herein, refers to a generic router which is responsible for routing an event to the same target. Routing an event to the same target is important because an event that is received from a cloud base center, such as InContact core, should be forwarded to the same Interaction Management (TM) instance. For every SSM an ELB service is attached to it for scaling purposes.

The term "Interaction Manager (RM) service" as used herein, refers to a microservice that is responsible for events (CTI/CDR), which are received from the contact center through SSM. The main purpose of this service is to manage the state of every Computer Telephony Integration (CTI) call event and send a recording request to the relevant recorder.

Once the call is finished, the IM sends the one or more segments of the recording to the Kinesis data stream.

The term "Public Switched Telephone Network (PSTN)" as used herein, refers to the aggregate of the world's circuit-switched telephone networks, that are operated by national, regional, or local telephone operators, and providing infrastructure and services for public telecommunication.

The embodiments taught herein relating to contact interactions in a Contact Center (CC) with contact interactions between a customer and an agent i.e., a CC representative is merely shown by way of example and technical clarity, and not by way of limitation of the embodiments of the present disclosure. The embodiments herein for effective coaching by automatically pointing on an influencer on measured performance may be applied on any customer service channel, such as, Interactive Voice Response (VR) or mobile application. Furthermore, the embodiments herein, are not limited to a CC, but may be applied to any suitable platform that is providing customer service channels.

Commonly, contact centers measure success according to Key Performance Indicators (KPIs). One of the top KPIs is Average Handling Time (AHT). AHT is mainly impacted by After-Call-Work (ACW) time. ACW includes, e.g., logging of contact reason, outcome, follow-up actions, and various communications. The ACW time depends on business domain, call characteristics, contact center processes etc. The quality of the ACW depends on the completeness of the information that has been logged and the time that has taken by the agent to fill up details.

Contact centers constantly monitor interactions between customers and agents in the contact center for later evaluation. The purpose of the evaluation is to identify low level performance of the agents and accordingly to tailor training and coaching programs to the agents to enhance their performance or alternatively to identify inefficient process and amend them.

According to some embodiments of the present disclosure, interactions between the agents and clients may be filtered by a quality plan component that is being operated in the contact center systems, before they are sent for evaluation. The quality plan component aims to reveal which areas of expertise need improvement by various factors and accordingly one or more training programs are assigned to the agents to increase their performance or alternatively the to modify inefficient processes.

According to some embodiments of the present disclosure, a factor which may reveal which areas of expertise need improvement may be an indication as to After Call Work (ACW) time. ACW depends on the business domain, interaction characteristics and processes of the contact center.

Poor customer service may have high cost for businesses. A 5% lift in customer retention can boost a company's profitability by 75%, according to Bain & Company. Therefore, customer satisfaction may be increased due to optimization of ACW factor for the interaction and also Net Promoter Score (NPS) may show a marked improvement. For a contact center, an average NPS growth of 7% correlates with a 1% growth in revenue.

According to some embodiments of the present disclosure, a machine learning model may be built and trained to predict ACW time for an interaction. Before starting to build the machine learning model, data preprocessing may be operated.

According to some embodiments of the present disclosure, the data preprocessing may include handling missing data, encoding categorical data, splitting data into training data and test data and feature scaling.

According to some embodiments of the present disclosure, any missing data for numerical features are to be replaced by the average of the data present for that feature. One hot encoding technique will be used for encoding the categorical data where multiple categories are present in a feature. Label encoding to be used to encode the data where only two categories are present including the dependent variable.

According to some embodiments of the present disclosure, 80% of the data may be used as the training set and 20% may be used as the test set. The percentage of test and training data might be varied while training the machine teaming model.

According to some embodiments of the present disclosure, even though feature scaling is not mandatory it may be operated to train the machine learning model to be more effective. A Standardization technique may be used for feature scaling. Feature scaling may be executed after the data set is divided into training set and test set.

According to some embodiments of the present disclosure, once the data preprocessing is done, the machine learning may be trained with various classification algorithms, such as multiple linear regression, logistic regression, support vector machine and the like.

According to some embodiments of the present disclosure, an evaluation of the trained machine learning model to predict ACW time of an interaction may be operated. Various methodologies may be used to evaluate the prediction, i.e. predicted ACW time, such as Root Mean Square Error (RMSE), Adjusted R Square, Mean Absolute Error (MAE) and the like.

According to some embodiments of the present disclosure, once the machine learning to predict an ACW time is selected, it may be used to predict ACW time.

According to some embodiments of the present disclosure, an ACW factor may be calculated by an ACW factor calculation module, according to the predicted ACW time and the actual ACW time. The ACW factor may be determined as positive, zero or negative.

According to some embodiments of the present disclosure, the ACW factor may be indicative if the pain point is with the accuracy of information in the call log or the speed of an agent in completing the ACW activity. A negative ACW factor may represent that the time taken in 'After-call work' activities may be considered low and the interaction should be evaluated for the completeness of the information which has been logged in the call log.

According to some embodiments of the present disclosure, a positive ACW factor may represent that the time taken in 'After-call work' activities may be considered high and the interaction should be evaluated for training requirement for an agent, correction in processes, etc.

According to some embodiments of the present disclosure, the ACW factor may be utilized as a filter during a distribution of a recorded agent interaction to an evaluator, based on an ACW factor that may be set by a user, such as a manager. A recorded interaction may be filtered and distributed to an evaluator and accordingly the evaluator may use this factor for evaluating such interactions.

According to some embodiments of the present disclosure, the ACW Factor may be available for various downstream applications like Quality Management (QM) and supervisor dashboards to use this data point, while evaluating an interaction. The ACW factor may lead to having more focus on optimizing and improving processes, more appropriate training assignments and prompt remedial measures by managers, related to the ACW.

According to some embodiments of the present disclosure, existing solutions don't include any way to identify an interaction having unusual high or low ACW time for a given context. Having high or low ACW time doesn't always mean that there is a problem that needs to be improved because the context of the interaction may also influence the ACW time. Hence, the actual ACW time alone cannot be used to determine the quality of the ACW activities.

FIG. 1 schematically illustrates a high-level diagram of a computerized system 100 for calculating an After-Call-Work (ACW) factor of an interaction in a contact center, by which a related recording may be filtered for evaluation, in accordance with some embodiments of the present disclosure.

According to some embodiments of the present disclosure, input data sources of historical data, such as input data sources 105 or of any other input data sources, may be aggregated by a data aggregator component, such as data aggregator component 130.

According to some embodiments of the present disclosure, the historical data may be aggregated from data sources, such as Automatic call distributor (ACD), Quality Management (QM) system, Workforce Optimization and analytics applications or any other system (not shown).

According to some embodiments of the present disclosure, the data aggregator 130 may store the aggregated data in a contact data indexer, such as contact data indexer 135.

According to some embodiments of the present disclosure, the data stored in the contact data indexer 135 may be used to train a machine learning model, such as machine learning model 110 to calculate a predicted ACW time for an interaction.

According to some embodiments of the present disclosure, the machine learning model 110 may be built and trained based on the data fields associated with the interaction and data fields associated with the customer. The data fields which are associated with the interaction may be related to the complexity of the interaction and accordingly might affect the ACW time. The data fields which are associated with the customer may also have an impact in the ACW time.

According to some embodiments of the present disclosure, data fields associated with the interaction, may include at least one of: duration of the interaction; campaign under which the interaction was taken; an indication if a First Call Resolution (FCR) was achieved; an indication if there was a channel switch during the interaction; the number of times that the customer was on hold; average feedback rating provided by customers in an interaction context; a proficiency level of the agent used to route the interaction; and occupancy rate in the contact center before the interaction.

According to some embodiments of the present disclosure, data fields associated with the customer, may include at least one of: customer feedback for the interaction; customer sentiment score for the interaction; and pattern of customer feedback.

According to some embodiments of the present disclosure, long duration of an interaction might consume longer time of ACW. The indication if an FCR was achieved may affect the ACW time, probably if FCR was achieved then the expected ACW time is shorter than the ACW time of an interaction where FCR was not achieved. The number of times that the customer was on hold may indicate that the customer has a complicated issue and therefore the ACW time may be longer. The average feedback rating provided by customers in the interaction context may signify the complexity of the interaction hence affect the ACW time. The proficiency level of the agent used to route the interaction, may also impact the ACW time because when higher level of proficiency is required then the longer the interaction may be more complicated hence longer time of ACW. The occupancy rate in the contact center before the interaction may indicate the fatigue level of the agent and hence it may impact the ACW time.

According to some embodiments of the present disclosure, customer feedback for the interaction and customer sentiment score of the interaction may be related to ACW time, because when the customer feedback and the sentiment score are not good then, it might mean that the customer is unhappy with services, products, schemes or with the overall agent interaction. This dissatisfaction of the customer may result with more feedback information and actions points for contact center that need to be logged and hence, ACW time might be prolonged.

According to some embodiments of the present disclosure, as to the pattern of customer feedback, a customer who has negative feedback for last several contacts, might not be happy with the interaction. In such a case, more information, i.e., after call activities and details to be logged are expected and hence, ACW time may be prolonged. Whereas a customer who has positive feedback for the last several interactions may be happy with the way interactions are carried out and hence ACW time would not be affected.

According to some embodiments of the present disclosure, after the machine learning model 110 has been built and trained it may be deployed to calculate a predicted ACW time. The calculated predicted ACW time may be forwarded to an ACW factor calculation module, such as ACW factor calculation module 115.

According to some embodiments of the present disclosure, the ACW factor calculation module, such as ACW factor calculation module 115, may calculate an ACW factor based on the received time of ACW of an interaction and the calculated predicted ACW time for the interaction by the machine learning model 110.

According to some embodiments of the present disclosure, to calculate the predicted ACW time, the machine learning model 110 may be provided with data fields, which are associated with the interaction and the customer.

According to some embodiments of the present disclosure, the ACW factor may be calculated by dividing a subtraction of the predicted ACW time from the ACW time, by the predicted ACW time, according to formula I:

$$ACW \text{ factor} = \frac{ACW_{actual} - ACW_{predicted}}{ACW_{predicted}}$$

whereby:
ACW actual is the duration of the ACW,
ACW predicted is the predicted ACW by the machine learning model.

According to some embodiments of the present disclosure, the calculated ACW factor may be forwarded to other systems, such as supervisor dashboard 120 and Quality Management (QM) system 125 or any other system (not shown) for identifying low level of performance of agents and inefficient processes in the contact center.

According to some embodiments of the present disclosure, the ACW factor may be utilized after it has been forwarded to the supervisor dashboard 120 for taking follow-on remedial measures, for example, for manager-agent communication 140 to discuss agent's performance improvement or any other purposes.

According to some embodiments of the present disclosure, when the predicted ACW time is consistently above or below the actual ACW time, the supervisor dashboard 120 may reflect the same. Based on this indicator, a supervisor may have a prompt discussion with the agent to understand the reasons for the same. There may be some external factors at play such as slow systems or inefficient processes which may lead to increase in ACW time, or there maybe be agent specific issues, such as specific training requirements or not well versed with usage of internal applications. Thus, the supervisor and the agent can get valuable insights post this interaction and can list down probable action points for the same.

According to some embodiments of the present disclosure, the ACW factor may be utilized by the QM system 125 for coaching packages assignment to agents 145 or for process optimization 150.

According to some embodiments of the present disclosure, the calculated ACW factor may have a positive value, a negative value or zero.

According to some embodiments of the present disclosure, when the value of the ACW factor is negative it may be an indication that the interaction should be evaluated for completeness of information, which has been logged.

According to some embodiments of the present disclosure, when the value of the ACW factor is positive it may be an indication that the interaction should be evaluated for training requirement for the agent. When the value is within a preconfigured distance threshold from zero, it may be an indication that the interaction doesn't have to be evaluated in a context of ACW factor.

In a non-limiting example, when the predicted ACW time is '120' seconds, and the preconfigured distance threshold from zero is '0.2' then, when the actual ACW time is '30' seconds the calculated ACW factor, according to formula I is '−0.75'. Accordingly, since '−0.75' is far from zero, than '0.2', the ACW factor may be sent to a platform, such as supervisor dashboard 120 and QM system 125, by which the platform is preconfigured to distribute the interaction for evaluation, based on the ACW factor.

In a non-limiting example, when the predicted ACW time is '120' seconds, and the preconfigured distance threshold from zero is '0.2' then, when the actual ACW time is '110' seconds, the calculated ACW factor, according to formula I is '−0.08'. Accordingly, since '−0.08' is not far from zero than '0.2', the ACW factor may not be sent to a platform, such as supervisor dashboard 120 and QM system 125.

In a non-limiting example, when the predicted ACW time is '120' seconds, and the preconfigured distance threshold from zero is '0.2' then, when the actual ACW time is '135' seconds the calculated ACW factor, according to formula I is '−0.12'. Accordingly, since '−0.12' is not far from zero than '0.2', the ACW factor may not be sent to a platform, such as supervisor dashboard 120 and QM system 125.

In a non-limiting example, when the predicted ACW time is '120' seconds, and the preconfigured distance threshold from zero is '0.2' then, when the actual ACW time is '300' seconds the actual ACW time is '135' seconds the calculated ACW factor, according to formula I is '1.5'. Accordingly, since '1.5' is far from zero than '0.2', the ACW factor may be sent to a platform, such as supervisor dashboard 120 and QM system 125, by which the platform is preconfigured to distribute the interaction for evaluation, based on the ACW factor.

Figure 2:
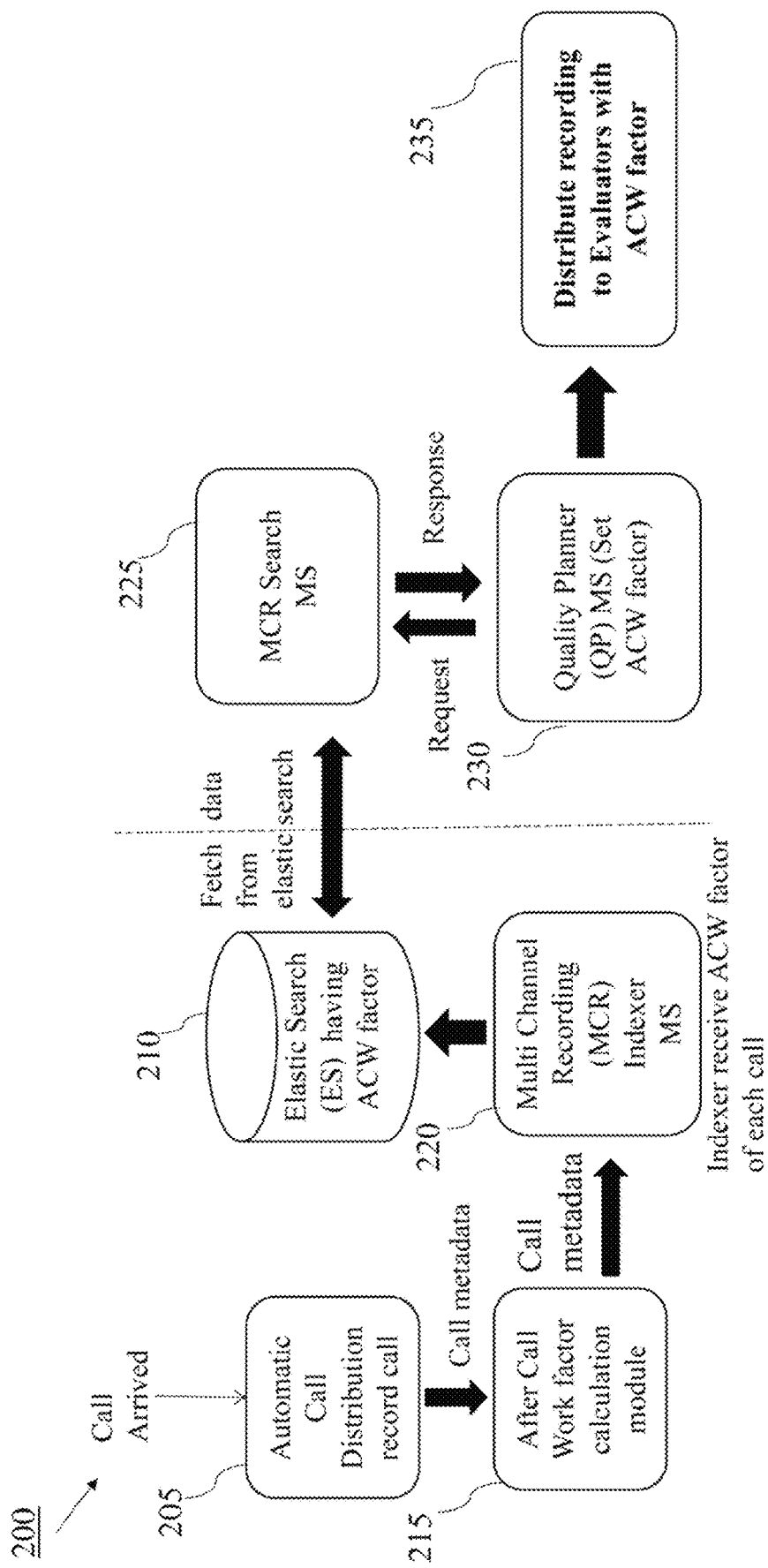
FIG. 2 schematically illustrates a high-level diagram of a computerized system for implementing ACW factor of an interaction in a contact center, in accordance with some embodiments of the present disclosure.

FIG. 2 schematically illustrates a high-level diagram of a computerized system 200 for implementing ACW factor of an interaction in a contact center, in accordance with some embodiments of the present disclosure.

According to some embodiments of the present disclosure, an interaction may have to the contact center system via various communication channels, such as voice, chat, email and the like. When the interaction arrives via any communication channel, it may be distributed via an Automatic call distributor (ACD), such as ACD 205 or any other interaction recorder to an agent and recorded by it. After the interaction with the customer ends, the metadata of the interaction may be deduced to be stored in an interaction metadata database (not shown).

According to some embodiments of the present disclosure, the metadata of the interaction may be forwarded to a After Call Work (ACW) factor calculation module 215, such as ACW factor calculation module 115 in FIG. 1, or such as ACW factor module 300 in FIG. 3. The ACW module 215 may calculate ACW factor according to received time of ACW of the interaction and a calculated predicted ACW time. The predicted ACW time may be calculated by a machine learning model, such as machine learning model 110 in FIG. 1.

According to some embodiments of the present disclosure, the ACW factor may have a negative value, a positive value or close to zero, according to a preconfigured distance threshold from zero.

According to some embodiments of the present disclosure, a positive ACW factor may represent that the time taken in 'After-call work' activities may be considered high and the interaction should be evaluated for training requirements for the agent, correction in contact center processes, etc. A negative ACW factor may represent that the time taken in 'After-call work' activities may be considered low and the interaction should be evaluated for the completeness of the information which has been logged in the call log.

According to some embodiments of the present disclosure, an ACW factor may be calculated by considering the duration of the interaction the campaign under which the interaction has been taken; an indication if First Call Resolution (FCR) was achieved for the interaction; an indication if there was a channel switch during the interaction; the number of times that the customer was put on hold during the interaction; the skill used to route the interaction, an occupancy rate in the contact center before the interaction; customer feedback for the interaction, customer sentiment score on the interaction; pattern of customer feedback; average feedback rating provided by customers in a given interaction context and other data or any combination thereof.

According to some embodiments of the present disclosure, building the machine learning model may be performed by one or more iterations of: (i) data collection, preparation, cleaning and visualization; (ii) feature engineering; (iii) algorithm selection; (iv) train model; (v) model evaluation based on performance measures, such as precision, accuracy, F-score, etc.

According to some embodiments of the present disclosure, the predicted ACW time may be calculated using a regression model. The regression model may be created by the following algorithms: multiple liners regression and support vector machine.

According to some embodiments of the present disclosure, after the ACW factor calculation module 215 have calculated the ACW factor, the ACW factor may be forwarded to several components in the contact center system 200, such as Multi-Channel Recording (MCR) Indexer Micro Service (MS) 220, which may forward it to a search engine database, such as an Elastic Search (ES) database 210. The ES database 210 may be a document-oriented database which is stored inside the AWS cloud.

According to some embodiments of the present disclosure, MCR search MS 225 may fetch data, such as ACW factor from the search engine, e.g., ES having ACW factor 210 and may forward it to a Quality Planner (QP) MS component such as QP MS component 230. A QP MS component, such as QP MS 230, may be Quality Management Analytics (QMA) Tool which is commonly used to distribute interaction recordings across evaluators, as per the configuration of a QP MS 230.

The QP MS component 230 enables quality plans management from a centralized location. These quality plans may randomly select agent recorded interactions, based on predefined criteria, and then to distribute those recorded interactions to evaluators with the ACW factor 235, for evaluation and review of agent's performance. After a quality plan may be created and activated by the QP MS component 230, it may sample interactions from the agents which are defined in the quality plan and send the relevant interaction recording segments to evaluators for review. A scheduled job may run as per the configuration in the configuration file e.g., every two hours, and distributes the interaction recording segments evenly among all evaluators by existing algorithm support even distribution.

Whenever a user, such as a manager creates a new quality plan, then the QP MS component 230 calls MCR Search MS 225, which queries the search engine database, e.g., elastic search database 210 to get the interaction recording segments of an agent as per a date range. The QP MS component 230 may check the value of the ACW factor as retrieved from the ES database 210 and then may apply a filter accordingly, to distribute the interaction recording segments among the evaluators.

According to some embodiments of the present disclosure, before the QP MS component 230 distributes an interaction recording segments to an evaluator, it may check the ACW factor of an interaction. Depending on which ACW factor has been configured to be distributed, e.g., positive, negative or zero or any combination thereof the QP MS component 230 may distribute the interaction recording segments of the interaction for evaluation. The distributed interaction for evaluation may be reviewed by an evaluator for due consideration and follow-on remedial measures to enhance call centre and agent's efficiency.

According to some embodiments of the disclosure, when the value of the ACW factor is zero or within a preconfigured distance threshold from zero it means that the interaction will not be evaluated for due consideration with regards to ACW factor.

According to some embodiments of the disclosure, the due consideration may be selected from at least one of: (i) identifying low level of performance of agents; and (ii) inefficient processes in the contact center.

Accordingly, the follow-on remedial measures may be selected from at least one of: (i) assigning the agent to a coaching plan based on the identified low level of performance; and (ii) optimizing processes in the contact center. Training requirements for an agent, based on long time taken for ACW activities may be for example, undertaking ACW tasks while on live interaction with the customer or efficient notes taking or using shorthand and abbreviations in the notes or effective time management. Training requirements for an agent, based on short time taken for ACW activities may be for example, providing the agents a list of all required information in a call log.

According to some embodiments, Quality planner MS 230 may use the calculated ACW factor to filter out interactions from distribution for evaluation. If the ACW factor value is not as preconfigured it may not send the interaction recording segments for evaluation. Interactions having an ACW factor value which is not as preconfigured, may be filtered out and not sent for evaluation.

Figure 3B:
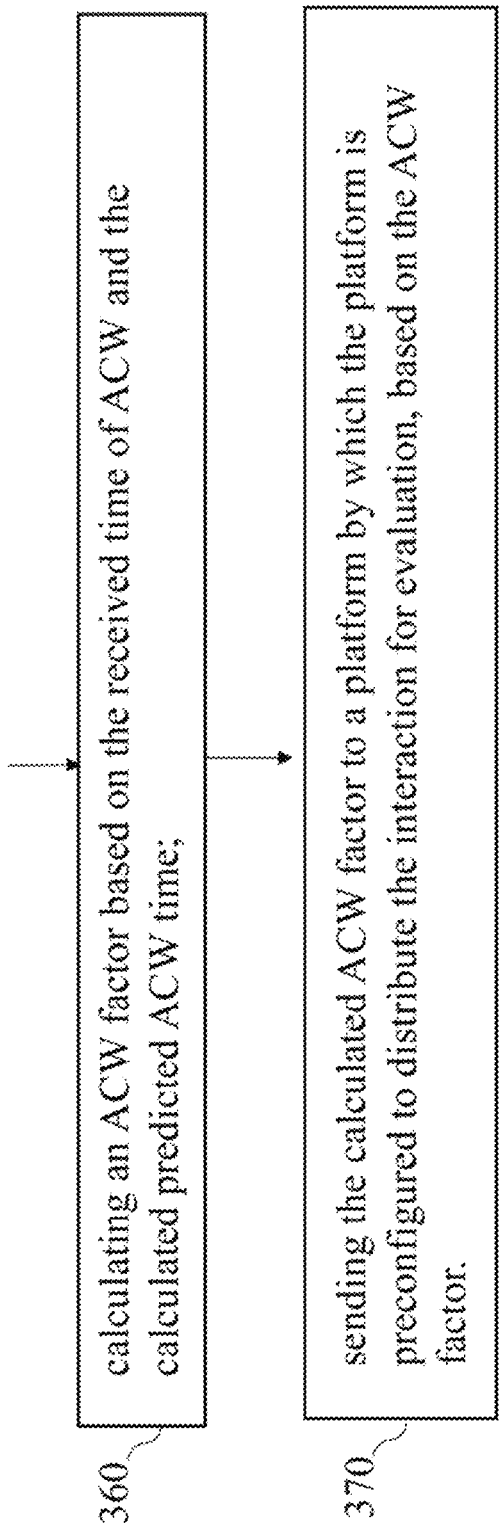

FIGS. 3A-3B high-level workflow of After Call Work (ACW) calculation module 300 for calculating an ACW factor of an interaction in a contact center, by which related agent recording segments may be filtered for evaluation, in accordance with some embodiments of the present disclosure.

According to some embodiments of the present disclosure, operation 310 may comprise receiving agent recording of an interaction.

According to some embodiments of the present disclosure, operation 320 may comprise aggregating data fields associated with the interaction and the customer.

According to some embodiments of the present disclosure, operation 330 may comprise retrieving After Call Work (ACW) time of the interaction.

According to some embodiments of the present disclosure, operation 340 may comprise forwarding the aggregated data fields to a machine learning model.

According to some embodiments of the present disclosure, operation 350 may comprise operating the machine learning model to calculate a predicted ACW time, based on the aggregated data fields.

According to some embodiments of the present disclosure, operation 360 may comprise calculating an ACW factor, based on the received time of ACW and the calculated predicted ACW time.

According to some embodiments, operation 370 may comprise sending the calculated ACW factor to a platform by which the platform is preconfigured to distribute the interaction for evaluation, based on the ACW factor.

Figure 4A:
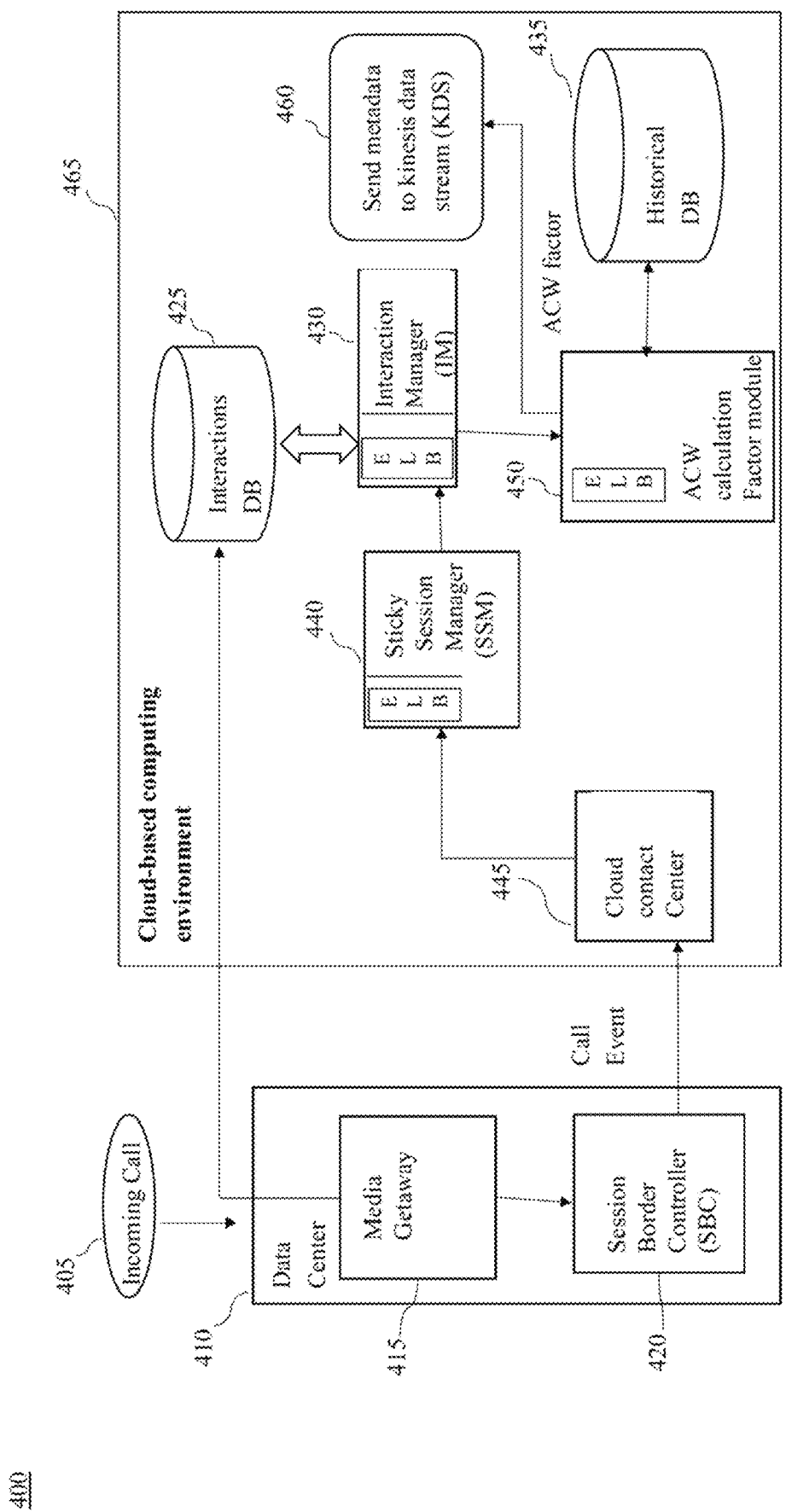
FIGS. 4A-4B schematically illustrate high-level diagram of call recording and indexing of interaction metadata along with ACW factor, in accordance with some embodiments of the present disclosure.
Figure 4B:
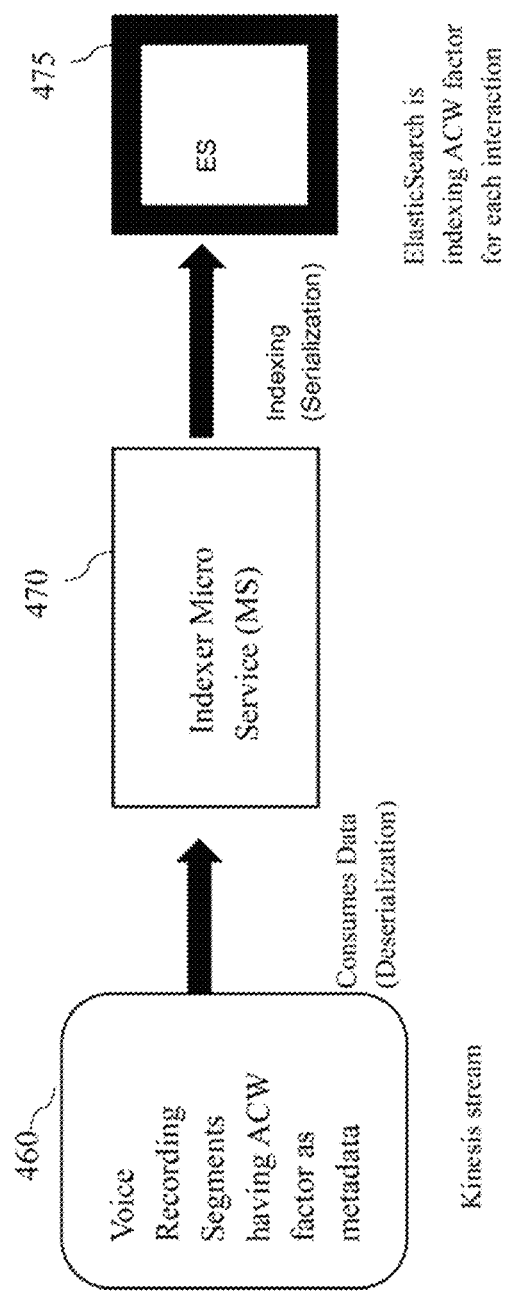

FIGS. 4A-4B schematically illustrate high-level diagram of call recording and indexing of interaction metadata along with ACW factor 400, in accordance with some embodiments of the present disclosure.

According to some embodiments of the present disclosure, a Data Center (DC) 410 may comprise session recording components. The DC 410 may comprise: a Media Gateway 415 and a Session Border Controller (SBC) 420. The media gateway 415 may be configured for transmitting telephone calls, such as incoming call 405, between an Internet Protocol (IP) network and traditional analog facilities of the Public Switched Telephone Network (PSTN). In other words, the media gateway 415 may be configured for converting incoming signal into a relevant SIP format and provide this information to SBC 420.

According to some embodiments of the present disclosure, data center 410 may be connected to a cloud-based computing environment 465. The cloud-based computing environment may be Amazon Web Services (AWS).

According to some embodiments of the present disclosure, the SBC 420 may be configured to protect and regulate IP communications flows. The SBC 420 may be deployed at network borders to control IP communications sessions. It is used to regulate all forms of real-time communications including VoIP, IP video, text chat and collaboration sessions. Furthermore, the SBC 420 may manipulate IP communications signaling and media streams, and providing a variety of functions including: security, multivendor interoperability, protocol interworking, Quality of Service and session routing.

According to some embodiments of the present disclosure, a cloud-based center 445, such as inContact core may be hosted in a cloud-based computing environment, such as Amazon Web Services (AWS) and may be responsible for retrieving Computer Telephone Integration (CTI) event from an SBC, such as SBC 420.

According to some embodiments of the present disclosure, when a new call interaction 405 arrives in the contact center then, a cloud based center 445, e.g., a contact core service may send a new Computer Telephony Integration (CTI) event to a generic router such as Sticky Session Manager (SSM) 440 as received from the SBC 420 and it may route the event to an Interaction Manger (IM) 430.

According to some embodiments of the present disclosure, the IM 430 may manage the state of every CTI event and may send state to a task manager microservice and also may send a recording request to the relevant recorder. Once the interaction is finished, the IM 430 may send the agent recording segments of the interaction to the Kinesis Data Stream (KDS).

According to some embodiments of the present disclosure, an Interaction Manager (IM) such as IM 430 may get call detail records for the completed calls from the table-oriented database 225. The interactions database 425 may be for example, a table-oriented database such as MySQL database.

According to some embodiments of the present disclosure, the IM 430 may send the interaction detail records along with the retrieved data through Representational State Transfer (REST) Application Programming Interface (API) to an ACW factor calculation module. The ACW factor calculation module may be a ACW factor calculation module, such as ACW factor calculation module 450, ACW factor calculation module 115 in FIG. 1, ACW factor calculation module 215 in FIG. 2 and ACW factor calculation module 300 in FIGS. 3A-3B for calculating an ACW factor of an interaction in a contact center, by which a related recording may be filtered for evaluation.

According to some embodiments of the present disclosure, the ACW factor calculation module 450 may calculate the ACW factor based on a received time of ACW and a calculated predicted ACW time. Once an interaction ends the ACW factor calculation module 450 may prepare a data model such as JSON object which includes an ACW factor and may send the metadata over to a kinesis data stream 460, such as Amazon KDS.

According to some embodiments of the present disclosure, system 400 may include an Indexer Micro-Service (MS) 470. The Indexer MS 470 may be configured to listen to real time data streaming service and when new metadata arrives it may index and store the metadata related to calculated ACW factor of an interaction into a database such as a document-oriented database (not shown).

According to some embodiments of the present disclosure, as part of Micro Service Architecture (Representational State Transfer (REST) API), the indexed data may be further retrieved from the database such a document-oriented database to retrieve the hold factor of the recorded call interaction.

According to some embodiments of the present disclosure, the Multi-Channel Recording (MCR) unit, such as MCR search MS 225 in FIG. 2 may be configured to retrieve: an interaction call, and indexed metadata from a document-oriented database such as database 210 in FIG. 2 related to the ACW factor of the recorded call interaction, according to a predefined quality plan created via Quality Planner Micro-Service 230 in FIG. 2.

According to some embodiments of the present disclosure, the elastic search database, such as database 210 in FIG. 2 may maintain the recording metadata in a JSON format. The indexer micro service, such as indexer MS 470, may keep listening to the Kinesis stream 460 continuously. Once the data is read from the Kinesis stream, it may be validated and processed and then it may be indexed in the elastic search database, such as ES database 210 in FIG. 2, indices. The indexer service, such as indexer MS 470 may support time-based multi-indices in the elastic search database.

According to some embodiments of the present disclosure, indexer MS 470 may index the call records by using index API and after then for each call record there will be a hold factor available inside the elastic search database such as ES database 210 in FIG. 2.

According to some embodiments of the present disclosure, the QP MS 230 in FIG. 2 may fetch the data from ES database 210 in FIG. 2 as per the plan duration of recorded segments. QP MS may check the ACW factor value preconfigured by a user, and accordingly provide a filtered input to the MCR Search MS 225 in FIG. 2 and the MCR search MS 225 in FIG. 2 may fetch the recorded segment from the ES database 210 in FIG. 2 and may provide response to QP MS 230 in FIG. 2. Thus, the QP MS 230 in FIG. 2 may distribute such recorded segments along with hold factor information to the evaluator which will be utilized by the evaluator for the evaluation of such segment.

Figure 5:
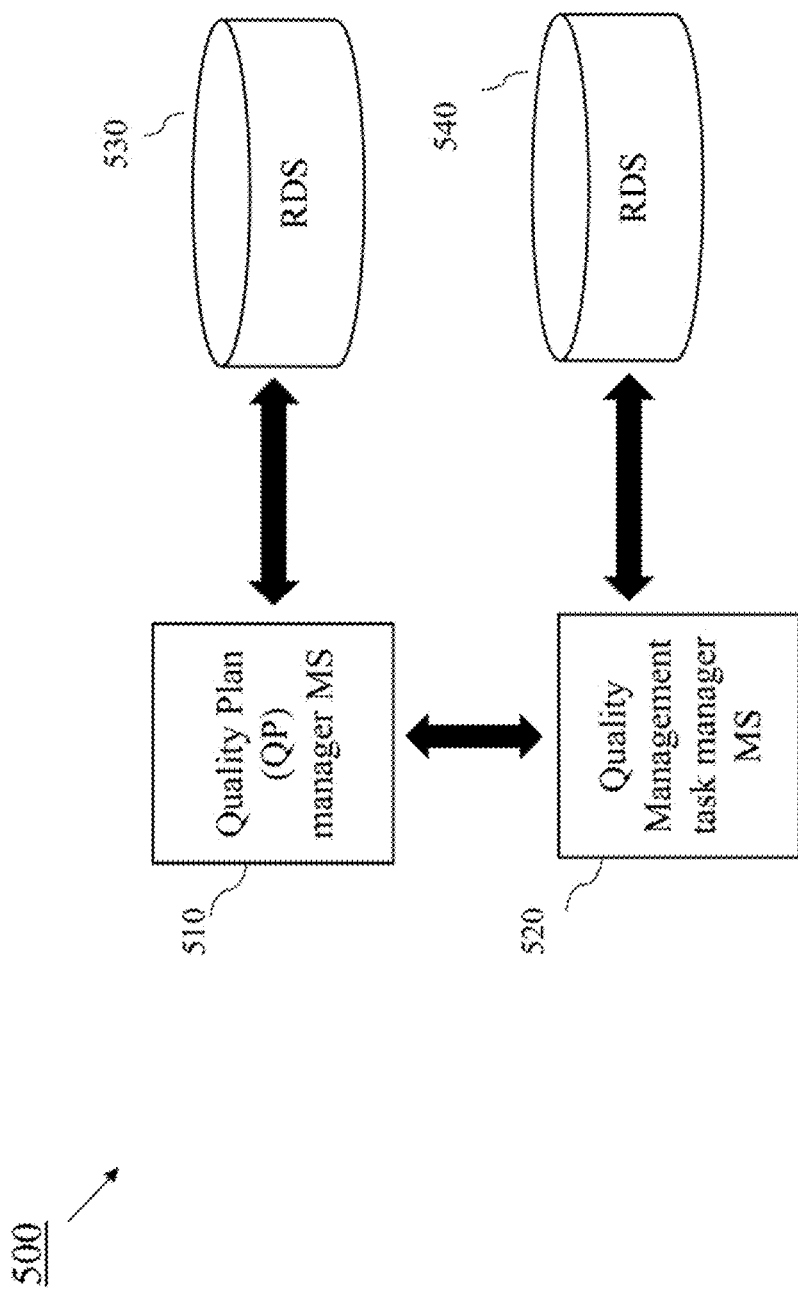
FIG. 5 schematically illustrates quality plans and metadata distribution, in accordance with some embodiments of the present disclosure.

FIG. 5 schematically illustrates quality plans and metadata distribution 500, in accordance with some embodiments of the present disclosure.

According to some embodiments of the present disclosure, quality plans and metadata distribution may comprise tree phases. Preparation phase, sampling phase and assignment phase.

According to some embodiments of the present disclosure, in the preparation phase, a user, such as a manager may create a quality plan via a QP manager such as QP manager 510 and QP manager 230 in FIG. 2 and assign a set of evaluators to the quality plan. The quality plan may be of two types i.e. one-time quality plan or recurring quality plan.

According to some embodiments of the present disclosure, in the one-time quality plan, once the agent segment is distributed to the evaluators, then the quality plan may be expired and of no use again. A recurring quality plan may be a monthly or weekly quality plan in which a quality planner may fetch the data from the elastic search, such as ES 475 in FIG. 4B on recurring basis and assign an agent interaction to the evaluator.

According to some embodiments of the present disclosure, in the sampling phase a QP MS, such as QP MS 230 in FIG. 2, may send a rest API call to the MCR search MS, such as MCR search MS 225 and the MCR search MS may be responsible for retrieving the sampled data stored inside the elastic search, such as elastic search 210 in FIG. 2, which may be a document oriented database.

According to some embodiments of the present disclosure, MCR Search MS, such as MCR search MS 225 in FIG. 2, may query elastic search, such as elastic search 210 in FIG. 2 to retrieve the information of agent recordings in which ACW Factor may be stored as parameter for each recording.

According to some embodiments of the present disclosure, in the assignment phase the QP MS, such as QP MS

230 in FIG. 2, may assign the set of agent interactions to a list of evaluators. Whenever a distribution process starts then each evaluator may receive an equal number of recording segments. For example, for four call interactions and two assigned evaluators for the QP then each evaluator may get equal number of segments, i.e. 2 interactions per each evaluator.

According to some embodiments of the present disclosure, the QP MS, such as QP MS 230 in FIG. 2, may receive a list of call interactions of agents from the Elastic search, such as ES 210 in FIG. 2 and then may randomly pick an agent by assigning priority to the set of agents and then assign it to evaluators.

According to some embodiments of the present disclosure, the QP MS, such as QP MS 230 in FIG. 2, may determine the priority of the agent by the number of call interactions which are associated with the agent. For example, if a first agent has one call interaction and a second agent has three call interactions then the priority of the second agent may be higher compared to the first agent. That is, the priority of the evaluated agents may be sorted from high priority to low priority. The priority of the evaluator may be determined by the number of interactions which are assigned for evaluations. For example, if a first evaluator has one interaction assigned to her and a second evaluator has three interactions assigned to him then the first evaluator's priority may be higher compared to the second evaluator. That is, the priority of the evaluators may be sorted from low priority to high priority. The maintained priority is to support equal distribution of the call interaction.

According to some embodiments of the present disclosure, QP manager MS, such as QP manager MS 510 and QP manager MS 230 in FIG. 2, may fetch the agent recordings from the elastic search, such as ES 210 in FIG. 2. QP manager MS 510 may also maintain its own database, such as Relational Database Service (RDS) 530 which may be used to store the priority of evaluators and agents and start distributing the segments of the recordings to the evaluators such as element 235 in FIG. 2.

According to some embodiments of the present disclosure, QM task manager MS, such as QM task manager MS 520, may be used to store the details of evaluation task that may be received from QP manager MS 510 in RDS 540. QM Task manager MS 520 may maintain the lifecycle of the evaluation tasks in a database, such as RDS 540.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computerized-method for calculating an After-Call-Work (ACW) factor of an interaction in a contact center, by which a related recording may be filtered for evaluation, the computerized-method comprising:
   in a computerized system comprising a processor, a database of data related to interaction metadata and skills of agent, a database of customer data; and a memory to store the plurality of databases, said processor is configured to operate, for each interaction between an agent and a customer, an After-Call-Work (ACW) factor calculation module, said operating of the ACW factor calculation module comprising:
   (i) calculating an ACW factor based on a received time of ACW and a calculated predicted ACW time; and
   (ii) sending the calculated ACW factor to a platform by which the platform is preconfigured to distribute the interaction for evaluation, based on the ACW factor.

2. The computerized-method of claim 1, wherein the platform is a quality planner microservice.

3. The computerized-method of claim 1, wherein the ACW factor is calculated by dividing a subtraction of the predicted ACW time from the ACW time, by the predicted ACW time.

4. The computerized-method of claim 1, wherein the data fields associated with the interaction, include at least one of:
   duration of the interaction;
   campaign under which the interaction was taken;
   First Call Resolution (FCR) achieved;
   channel switch during the interaction;
   number of times the customer was on hold;
   average feedback rating provided by customers in an interaction context;
   a proficiency level of the agent used to route the interaction; and
   an occupancy rate in the contact center before the interaction.

5. The computerized-method of claim 1, wherein the data fields associated with the customer, include at least one of:
   customer feedback for the interaction;
   customer sentiment score for the interaction; and
   pattern of customer feedback.

6. The computerized-method of claim 1, wherein the distributed interaction for evaluation is reviewed by an evaluator for due consideration and follow-on remedial measures to improve operational efficiency of the contact center and to improve customer satisfaction.

7. The computerized-method of claim 6, wherein the due consideration is selected from at least one of: (i) identifying low level of performance of agents; and (ii) inefficient processes in the contact center.

8. The computerized-method of claim 7, wherein the follow-on remedial measures are selected from at least one of: (i) assigning the agent to a coaching plan based on the identified low level of performance; and (ii) optimizing processes in the contact center.

9. The computerized-method of claim 1, wherein the ACW factor is having a value that is positive or negative or zero.

10. The computerized-method of claim 9, wherein when the value is negative it is an indication that the interaction should be evaluated for completeness of information, which has been logged, wherein when the value is positive it is an indication that the interaction should be evaluated for training requirement for the agent, and wherein when the value is within a preconfigured distance threshold from zero, it is an indication that the interaction doesn't have to be evaluated in a context of ACW factor.

11. The computerized-method of claim 1, wherein before the calculating of the ACW factor, said operating of the ACW factor calculation module is further comprising:
receiving agent recording of the interaction.

12. The computerized-method of claim 11, wherein after the receiving of the agent recording of the interaction, said operating of the ACW factor calculation module is further comprising:
aggregating data fields associated with: (a) the interaction; and (b) the customer.

13. The computerized-method of claim 12, wherein after the aggregating of data fields, said operating of the ACW factor calculation module is further comprising:
retrieving an ACW time of the interaction.

14. The computerized-method of claim 13, wherein after the retrieving of the AWC time, said operating of the ACW factor calculation module is further comprising:
forwarding the aggregated data fields to a machine learning model.

15. The computerized-method of claim 14, wherein after the forwarding of the aggregated data fields, said operating of the ACW factor calculation module further comprising:
operating the machine learning model to calculate a predicted ACW time, based on the aggregated data fields.

16. A computerized-system for calculating an After-Call-Work (ACW) factor of an interaction in a contact center, by which a related recording may be filtered for evaluation, the computerized-system comprising:
a database of data related to interactions and skills of agent;
a database of customer metadata;
a memory to store the plurality of databases; and
a processor, said processor is configured to operate for each interaction between an agent and a customer, an ACW factor calculation module, said operating of ACW factor calculation module is configured to:
(i) calculate an ACW factor based on a received time of ACW and a calculated predicted ACW time; and
(ii) send the calculated ACW factor to a platform by which the platform is preconfigured to distribute the interaction for evaluation, based on the ACW factor.

17. The computerized-system of claim 16, wherein the platform is a quality planner microservice.

18. The computerized-system of claim 16, wherein the ACW factor is calculated by dividing a subtraction of the predicted ACW time from the ACW time, by the predicted ACW time.

19. The computerized-system of claim 16, wherein the data fields associated with the interaction, include at least one of:
duration of the interaction;
campaign under which the interaction was taken;
First Call Resolution (FCR) achieved;
channel switch during the interaction;
number of times the customer was on hold;
average feedback rating provided by customers in an interaction context;
a proficiency level of the agent used to route the interaction; and
an occupancy rate in the contact center before the interaction.

20. The computerized-system of claim 16, wherein the data fields associated with the customer, include at least one of:
customer feedback for the interaction;
customer sentiment score for the interaction; and
pattern of customer feedback.

21. The computerized-system of claim 16, wherein the distributed interaction for evaluation is reviewed by an evaluator for due consideration and follow-on remedial measures to improve operational efficiency of the contact center and to improve customer satisfaction.

22. The computerized-system of claim 21, wherein the due consideration is selected from at least one of: (i) identifying low level of performance of agents; and (ii)-inefficient processes in the contact center.

23. The computerized-system of claim 22, wherein the follow-on remedial measures are selected from at least one of: (i) assigning the agent to a coaching plan based on the identified low level of performance; and (ii) optimizing the contact center processes.

24. The computerized-system of claim 16, wherein the ACW factor is having a value that is positive or negative or zero.

25. The computerized-system of claim 24, wherein when the value is negative it is an indication that the interaction should be evaluated for completeness of information, which has been logged, wherein when the value is positive it is an indication that the interaction should be evaluated for training requirement for the agent, and wherein when the value is within a preconfigured distance threshold from zero, it is an indication that the interaction doesn't have to be evaluated in context of ACW factor.

26. The computerized-system of claim 16, wherein before the calculating of the ACW factor, said operating of the ACW factor calculation module is further configured to receive agent recording of the interaction.

27. The computerized-system of claim 26, wherein after the receiving of agent recording of the interaction, said operating of the ACW factor calculation module is further configured to aggregate data fields associated with: (a) the interaction; and (b) the customer.

28. The computerized-system of claim 27, wherein after the aggregating of data fields, said operating of the ACW factor calculation module is further configured to retrieve an ACW time of the interaction.

29. The computerized-system of claim 28, wherein after the retrieving of the AWC time, said operating of the ACW factor calculation module is further configured to forward the aggregated data fields to a machine learning model.

30. The computerized-system of claim 29, wherein after the forwarding of the aggregated data fields, said operating of the ACW factor calculation module is further configured to operate the machine learning model to calculate a predicted ACW time, based on the aggregated data fields.

* * * * *